(12) United States Patent
Risch

(10) Patent No.: US 6,198,865 B1
(45) Date of Patent: Mar. 6, 2001

(54) TELECOMMUNICATIONS CABLE HAVING GOOD ADHESION BETWEEN A PROTECTIVE JACKET AND STRENGTH MEMBERS

(75) Inventor: Brian G. Risch, Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/374,027

(22) Filed: Aug. 13, 1999

(51) Int. Cl.$^7$ .................................................. G02B 6/44
(52) U.S. Cl. ........................ 385/113; 385/100; 385/109; 385/141
(58) Field of Search .................................. 385/100, 109, 385/113, 141

(56) References Cited

U.S. PATENT DOCUMENTS

| | | | |
|---|---|---|---|
| 4,241,979 | 12/1980 | Gagen et al. | 385/113 X |
| 4,723,831 | 2/1988 | Johnson et al. | 385/113 X |
| 4,743,085 | 5/1988 | Jenkins et al. | 385/113 X |
| 4,765,712 | 8/1988 | Bohannon, Jr. et al. | 385/113 X |
| 4,842,947 | 6/1989 | Jachec et al. | 428/461 |
| 4,844,575 | 7/1989 | Kinard et al. | 385/113 X |
| 4,906,690 | 3/1990 | Hasenbein et al. | 525/88 |
| 5,029,974 | 7/1991 | Nilsson | 385/113 |
| 5,050,957 | * 9/1991 | Hamilton et al. | 385/113 |
| 5,155,304 | * 10/1992 | Gossett et al. | 385/113 X |
| 5,189,120 | 2/1993 | Hasenbein et al. | 525/285 |
| 5,194,509 | 3/1993 | Hasenbein et al. | 525/285 |
| 5,384,192 | 1/1995 | Long et al. | 428/336 |
| 5,509,097 | * 4/1996 | Tondi-Resta et al. | 385/113 |
| 6,041,153 | * 3/2000 | Yang | 385/109 |

* cited by examiner

*Primary Examiner*—Brian Healy
(74) *Attorney, Agent, or Firm*—Ware, Fressola, Van Der Sluys & Adolphson LLP

(57) ABSTRACT

A telecommunications cable comprising a communications element, such as an optical fiber, and a jacket surrounding the communications element having at least one elongated strength member embedded therein is disclosed. The jacket of the telecommunications cable is formed by extruding a blend of a polyolefin material and a copolymer adhesion promoting material, such as graft copolymer of polyethylene and ethylene acrylic acid or a graft copolymer of polyethylene and maleic anhydride. The copolymer adhesion promoting material promotes adhesion between the strength member and the jacket. The resulting increase in adhesion between the strength member and the jacket improves the cable's resistance to water penetration, low temperature buckling and shrinkage as well as excessive high temperature expansion. The blending of an adhesion promoting material in the jacketing material also reduces the risk of armor cracking during cyclic flexing and strength member pistoning within the jacket.

20 Claims, 3 Drawing Sheets

TELECOMMUNICATIONS CABLE HAVING GOOD ADHESION BETWEEN A PROTECTIVE JACKET AND STRENGTH MEMBERS

BACKGROUND OF THE INVENTION

1. Field of the Invention

The present invention relates to telecommunications cables. More particularly, the present invention relates to a telecommunication cable having strength members adjacent to or embedded in a protective jacket made from a polymeric material having an adhesion promoter blended therein.

2. Description of the Prior Art

Telecommunications cables containing optical fiber cables have been used by the telecommunications industry for a number of years to transmit information at very high rates over long distances. Because the optical fiber transmission elements are delicate, the telecommunications cables are provided with members which are designed to protect the optical fibers. For example, in a typical optical fiber telecommunications cable, one or more optical fibers are disposed in a buffer tube which provides some protection against abrasion, as well as outside tensile and compressive forces. In a basic central tube design, a single buffer tube may be surrounded by an armor layer made from aramid yarns, water blocking tapes, metallic sheaths or some combination of such materials. The armor layer is typically surrounded by an outer protective sheath made from a polyolfin material such as medium density polyethylene (MDPE) or high density polyethylene (HDPE). To provide additional compressive and tensile strength to the cable, the outer protective jacket may be extruded over strength members made from composite materials containing glass reinforced fibers or steel so that such members become embedded in the outer protective jacket.

In some cables, copolymer adhesion promoters, such as ethylene-acrylic acid (EAA) are applied as a coating on composite strength members to promote adhesion between the strength members and the jacket extruded thereover. Alternatively, steel armor may be precoated with a copolymer material which promotes adhesion. Such strength members are marketed by t he Dow Chemical company under the ZETABON trademark. The jacket material is then extruded over this copolymer coated steel armor. Copolymer coatings, however, have the disadvantage that adhesion cannot be controlled during cable manufacturing.

Control of bonding is desirable in fiber optic cables to allow a combination of mechanical integrity and ease of cable access. If adhesion between the jacket and strength members or jacket is too low, debonding may occur during handling or installation. If jacket debonding occurs, the cable may show numerous mechanical or other problems. For example, if the strength members become debonded from the jacket pistoning of the strength members may be seen with temperature variation due to the different coefficient of thermal expansion (CTE) values for the different materials. If t he jacket and strength members do not remain coupled, low temperature cable contraction may be too high and attenuation may result. Additionally, debonding can result in water penetration failures in the cable. If the level of adhesion is too high, especially between steel armor ad the jacket, cable access may be difficult for splicing operations thereby increasing the effective time for cable access and splicing.

To control bonding, some have applied hot melt or other types of adhesives to the strength members or armor prior to the extrusion of the jacket material over the strength member or armor. These materials have become necessary to obtain the desired level of mechanical coupling or bonding between the jacket and the strength members or armor. However, the application of these materials to the strength member or armor during the cable manufacturing process increases the cost of manufacturing by adding another step to the manufacturing process.

Accordingly, what is needed is a mechanism to provide and control the adhesion between embedded elongated strength members and the protective jacket material during the jacketing process without significantly adding to the manufacturing cost of the cable. The present invention is intended to provide such a mechanism.

SUMMARY OF THE INVENTION

It is an object of the present invention to provide a telecommunications cable having a jacket which is reinforced by elongated strength members embedded therein.

It is another object of the present invention to provide a telecommunications cable having a jacket which has controlled adhesion to the elongated strength members embedded therein.

It is yet another object of the present invention to provide a telecommunications cable having a jacket which has controlled adhesion to an armor layer adjacent thereto and in contact therewith.

These objects are accomplished, at least in part, by a telecommunications cable comprising a communications element, and a jacket surrounding the communications element having at least one elongated strength member embedded therein, wherein the jacket is formed by extruding a blend of a polyolefin material and a copolymer adhesion promoting material which promotes adhesion between the strength member and the jacket.

Other objects and advantages of the present invention will become apparent to those skilled in the art from the following detailed description read in conjunction with the attached drawing and claims appended hereto.

DETAILED DESCRIPTION OF THE PRESENT INVENTION

Figure 1:
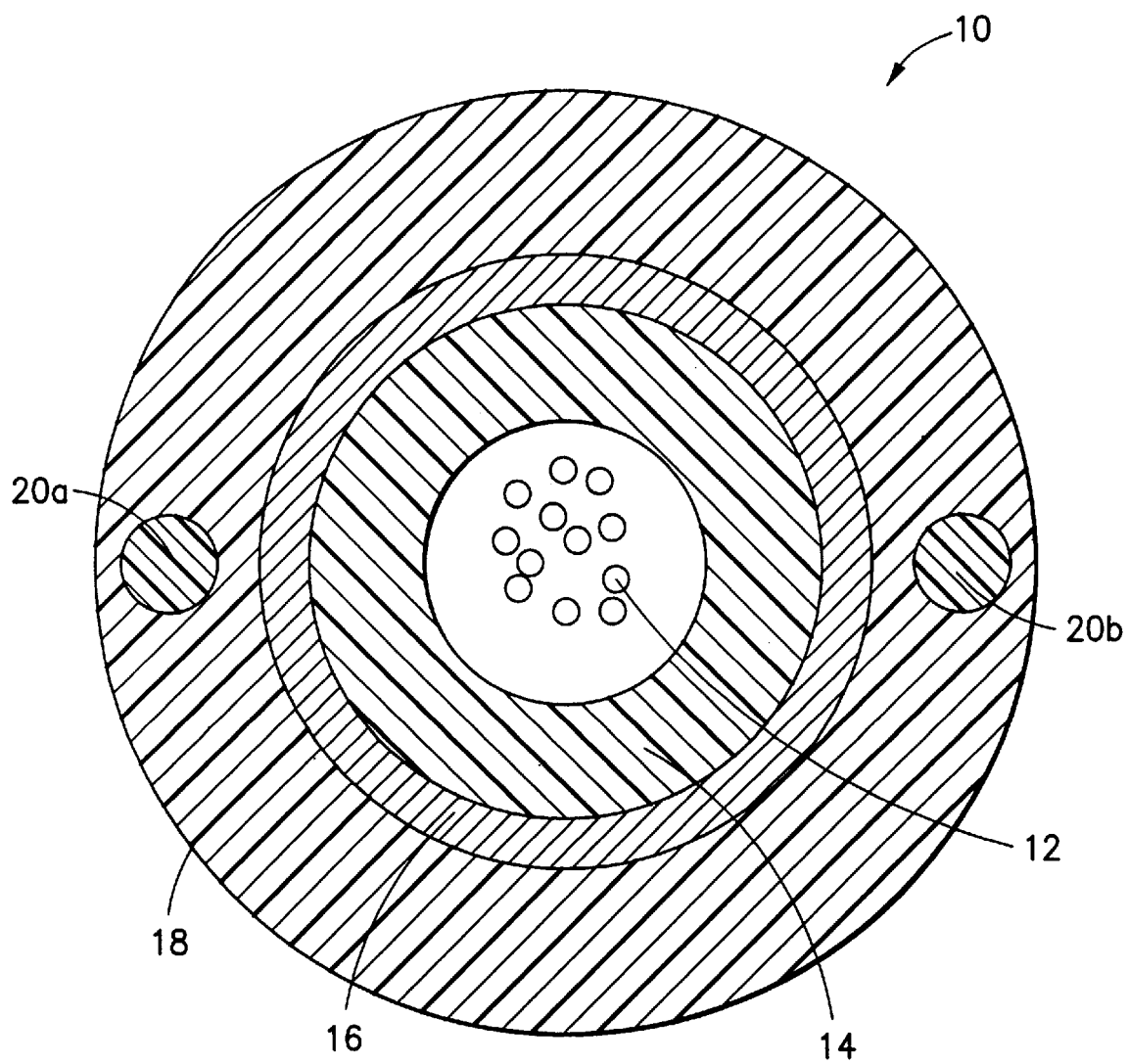
FIG. 1, which is a cross-sectional view of one embodiment of a telecommunications cable made according to the present invention.

Referring to FIG. 1, an embodiment of a telecommunications cable 10 made according to the present invention is formed, in part, by one or more communications elements 12, which are preferably ordinary optical fibers. A centrally located buffer tube 14 is extruded over the communications elements 12 so as to envelope them. The buffer tube may be extruded from any extrudable thermoplastic material such as polyvinyl chloride, polyethylene, polycarbonate (PC), polybutylene terephalate (PBT) or a thermoplastic polyolefin elastomer compound, but preferably, the buffer tube 14 is extruded from a nucleated polypropylene-polyethylene copolymer. Such a material is described in U.S. Pat. No. 5,574,814. Techniques for extruding thermoplastic material to form the buffer tube 14 over the communications elements 12 are well known in the art and therefore not described herein. Water blocking gels, water swellable yarn or water swellable powders (not shown) may also be disposed in the buffer tube 14, if desired. The buffer tube 14 provides the primary structure to protect delicate communications elements 12, such as optical fibers, contained therein.

To provide support and protection for the buffer tube 14 in the cable 10 after the buffer tube 14 is formed over the communications elements 12, the buffer tube 14 may be surrounded by a layer 16 formed by radial strength yarns, filling or flooding compounds, swellable water blocking tapes, corrugated metallic sheathing, or a combination of these various armor materials. Methods for forming this layer 16 over the buffer tube 14 are well known by those skilled in the art and a detailed description of a typical armor layer can be found in U.S. Pat. No. 5,029,974, which is incorporated herein by reference in its entirety.

Finally, the telecommunications cable is completed by the extrusion of a polyolefin, such as a medium density polyethylene (MDPE) or high density polyethylene (HDPE), outer jacket 18 over the buffer tube 14, or the layer 16 if a buffer tube or a layer has been provided. Typically, to provide additional strength to the telecommunications cable 10, elongated strength members 20a, 20b are positioned in a parallel spaced apart relationship relative to the buffer tube, or to the layer 16 if the cable 10 has such a layer, prior to the extrusion of the outer jacket 18. The elongated strength members 20a, 20b may be formed from a composite material such as a thermoplastic polymer reinforced with glass fibers, steel alloys or other suitable reinforcing materials. Provided that good adhesion is obtained between the outer jacket 18 and the elongated strength members 20a, 20b so that such components are mechanically coupled, the elongated strength members 20a, 20b enable the cable 10 to resist ordinary compressive and tensile forces which are placed on the cable 10 during installation and use in the field. It is important that such forces are resisted so that changes in the length of the cable 10 during installation and use are minimized to prevent straining, breaking or substantial bending of the communications elements, which is undesirable.

Figure 2:
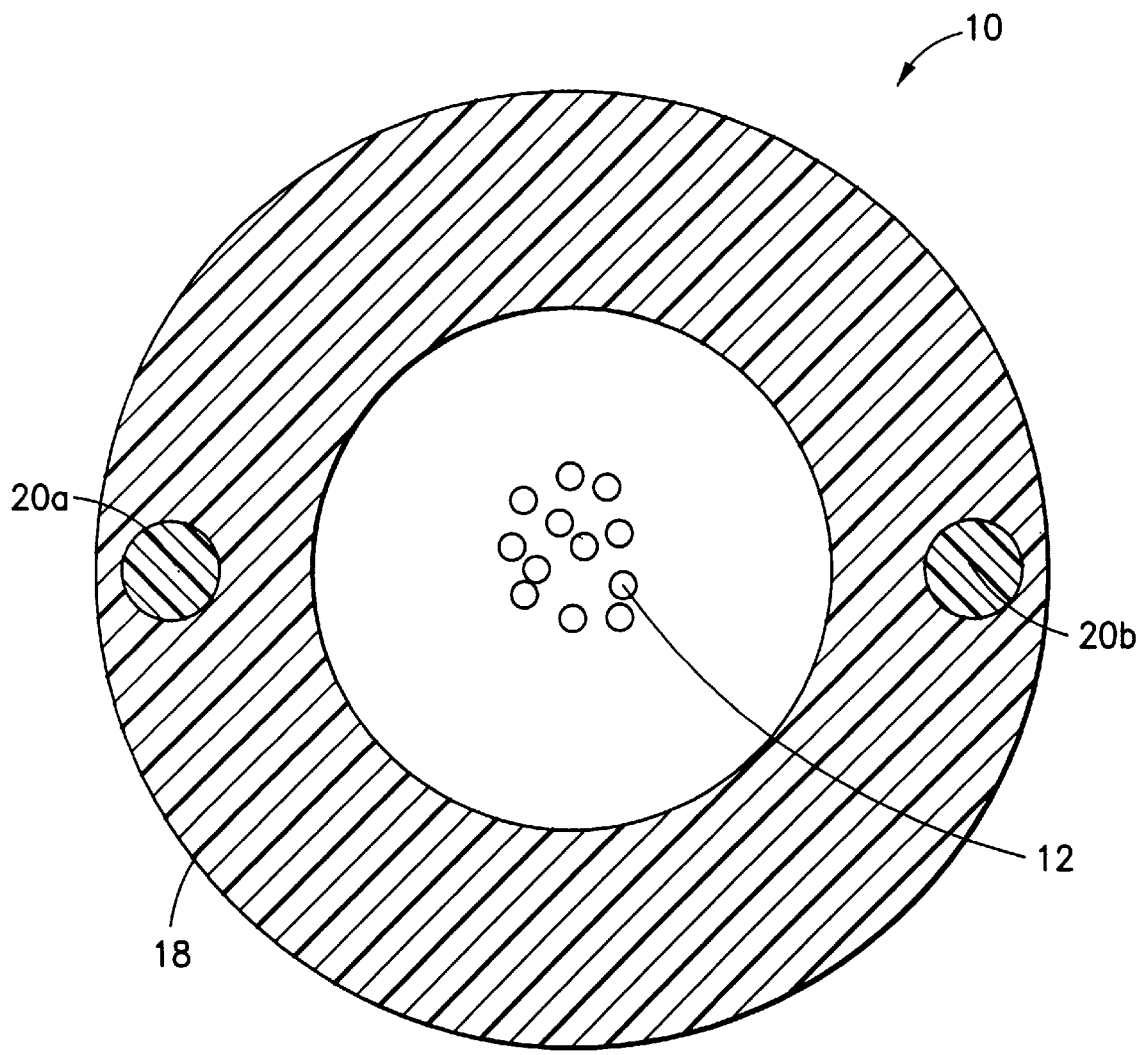
FIG. 2, which is a cross-sectional view of another embodiment of a telecommunications cable made according to the present invention.

As illustrated in FIG. 2, alternatively, the jacketing material may be extruded directly around the communications elements 12 to form a surrounding jacket and waterblocking compound while encapsulating the strength members 20a, 20b. Such a process and cable design eliminates the need for a buffer tube.

To promote good adhesion between the outer jacket 18, the elongated strength members 20a, 20b and between the outer jacket 18 and the layer 16, if the cable 10 has such a layer and the layer is of the typical armor type, the MDPE or HDPE jacketing material is blended with a graft copolymerized adhesion promoter prior to extrusion. According to the present invention, the graft copolymer is configured to contain polymer segments of two dissimilar chemical species that can promote improved adhesion between two dissimilar substrates, i.e., the polyolefin jacket and the elongated metallic or polymer strength member. Adhesion is promoted by providing chemical units within the jacketing polymer that migrate to the first substrate with like chemistry, such as the elongated glass reinforced polymer strength member. The same graft copolymer can have other chemical units that are similar to the other substrate, such as the polyolfin jacket material.

Graft copolymerized adhesion promoters that will work in accordance with the present invention include polar molecules such as ethylene acrylic acid or maleic anhydride which can be graft copolymerized to a polyolefin backbone to form an adhesion promoting material. The adhesion promoting material is blended into the MDPE, HDPE or polyolefin jacket material. This blending can take place directly during jacketing or as a prior compounding step. The polarity of the polar acrylic acid or maleic anhydride molecule provides good adhesion to metallic, glass or epoxy substrates. The polyolefin backbone has good compatibility and miscibility with the polyolefin jacket material. As jacket material is extruded over the elongated strength member during cable manufacturing, the similar chemical components of the graft copolymer migrate to the surface of the elongated strength member. This lowers the interfacial surface energy between the elongated strength member and the jacket material, thereby increasing adhesion between the elongated strength member and the jacket material. Two illustrative examples are set forth below.

EXAMPLE 1

Two cables containing embedded fiberglass reinforced epoxy elongated strength elements and jacketed with Union Carbide DHDA-8864 MDPE were manufactured under identical processing conditions with and without the addition of adhesion promoter. The cable that did not include the adhesion promoter failed a water penetration test with a penetration result of over 1M using a 1M head of water within one hour. A cable containing 5 weight percent of the adhesion promoter Polybond® 3009 in the polyolefin jacketing material blend had water penetration of less than 2 cm in 24 hours. Polybond® 3009 is a polyethylene/maleic anhydride graft copolymer produced by Uniroyal Chemical. The glass reinforced polymer (GRP) pullout forces for the cable that included no adhesion modifier were as low as 20 pounds, whereas the GRP pullout force on cables made with the blend containing Polybond® 3009 surpassed 100 pounds. The blending of 5 weight percent Polybond® 3009 adhesion promoter with the polyolefin jacketing material was sufficient to change the mode of pullout failure from interfacial failure between the reinforcing member to failure of the MDPE surrounding the reinforcing member.

Figure 3A:
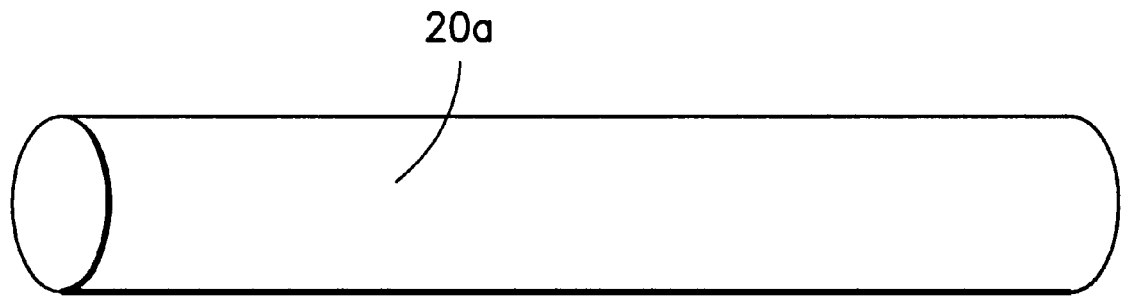
FIG. 3A, which is a schematic illustration of an elongated, fiberglass reinforced epoxy strength member after it was pulled out of a medium density polyethylene jacket containing no adhesion promoter.
Figure 3B:
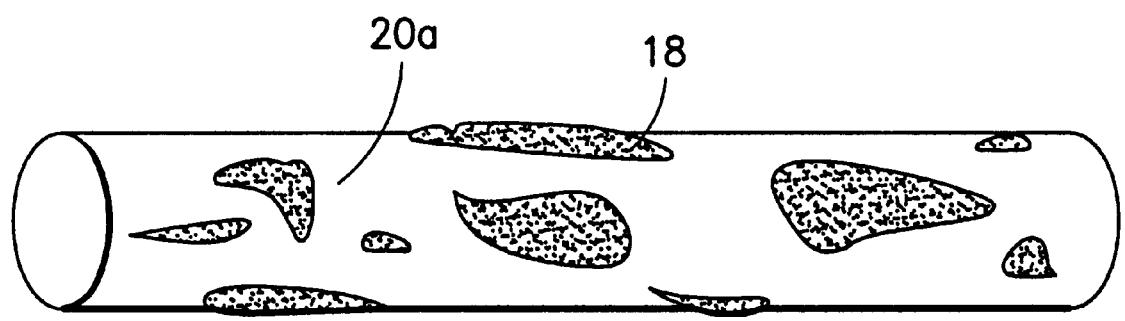
FIG. 3B, which is a schematic illustration of an elongated, fiberglass reinforced epoxy strength member after it was pulled out of a medium density polyethylene jacket made with an adhesion promoter according to the present invention.

FIG. 3A schematically shows the debonded surface of an elongated fiberglass reinforced epoxy rod 20*a* after a pullout test from a jacket containing no adhesion promoter. No evidence of the MDPE jacket remains on the rod after the pullout test, leaving it with a substantially clean surface. FIG. 3B schematically shows the debonded surface of fiberglass reinforced epoxy rod 20*a* after a pullout test from a jacket containing 5% Polybond® 3009 adhesion promoter. The debonded surface of the sample made with the blend of polyolefin and the adhesion promoter shows that the interfacial strength between the reinforcing member and the MDPE jacket was significantly increased to the point where jacket material 18 remains on the reinforcing member after the pullout test. The resulting increase in interfacial strength between the strength member and the jacket increases reinforcing member pullout force and also causes a failure mode that can dissipate more energy.

EXAMPLE 2

Two cables containing embedded steel strength elements and jacketed with Union Carbide DHDA-8864 MDPE were manufactured under identical processing conditions with and without the addition of adhesion promoter. The cable that did not include the adhesion promoter in the jacketing material failed a water penetration test with a penetration result of over 1M using a 1M head of water within one hour. A cable made from a blend of 95 weight percent polyolefin and 5 weight percent of the adhesion promoter Polybond® 1009 had water penetration of less than 2 cm in 24 hours. Polybond® 1009 is a polyethylene/acrylic acid graft copolymer produced by Uniroyal Chemical.

The increased adhesion between strength member and jacket material obtained by blending the adhesion promoter into the jacketing material reduces pistoning and improves water tightness of the cable as shown by the improved water penetration test results. Because the adhesion promoting material can be blended into the MDPE or HDPE jacket material, manufacturing costs are potentially lower due to the elimination of a separate strength member coating step and coating equipment.

It will thus be seen that the objects and advantages set forth above and those made apparent from the preceding descriptions, are efficiently attained and, since certain changes may be made in the above construction without departing from the scope of the invention, it is intended that the matter contained in the above description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall there between.

What is claimed is:

1. A telecommunications cable comprising:
   a communications element; and
   a jacket surrounding the communications element having at least one elongated strength member embedded therein, wherein the jacket is formed by extruding a blend of a polyolefin material and a copolymer adhesion promoting material which promotes adhesion between the strength member and the jacket.

2. The telecommunications cable of claim 1, wherein the polyolefin material is selected from the group consisting of medium density polyethylene and high density polyethylene, wherein the material forming the at least one elongated strength member is selected from the group consisting of fiberglass reinforced epoxy and steel and wherein the copolymer adhesion promoting material is selected from the group consisting of a graft copolymer of maleic anhydride and polyethylene and a graft copolymer of ethylene acrylic acid and polyethylene.

3. The telecommunications cable of claim 2, wherein the graft copolymer comprises approximately 5 weight percent of the blend.

4. The telecommunications cable of claim 1, wherein the communications element is an optical fiber.

5. A telecommunications cable comprising:
   a communications element;
   an armor layer surrounding the communications element; and
   a jacket in contact with the armor layer, wherein the jacket is formed by extruding a blend of a polyolefin material and a copolymer adhesion promoting material which promotes adhesion between the armor layer and the jacket.

6. The telecommunications cable of claim 5, wherein the polyolefin material is selected from the group consisting of medium density polyethylene and high density polyethylene, wherein the material forming the armor layer is selected from the group consisting of aramid yarns and wherein the copolymer adhesion promoting material is selected from the group consisting of a graft copolymer of maleic anhydride and polyethylene and a graft copolymer of ethylene acrylic acid and polyethylene.

7. The telecommunications cable of claim 6, wherein the graft copolymer comprises approximately 5 weight percent of the blend.

8. The telecommunications cable of claim 5, wherein the communications element is an optical fiber.

9. The telecommunications cable of claim 5, wherein the jacket has at least one elongated strength member embedded therein and wherein the copolymer adhesion promoting material further promotes adhesion between the elongated embedded strength member and the jacket.

10. The telecommunications cable of claim 5, wherein the polyolefin material is selected from the group consisting of medium density polyethylene and high density polyethylene, wherein the material forming the elongated strength member is selected from the group consisting of fiberglass reinforced epoxy and steel and wherein the copolymer adhesion promoting material is selected from the group consisting of a graft copolymer of maleic anhydride and polyethylene and a graft copolymer of ethylene acrylic acid and polyethylene.

11. A method for making a telecommunications cable, the method comprising:
    providing a communications element;
    providing at least one elongated strength member;
    extruding a blend of a polyolefin material and a copolymer adhesion promoting material to form a jacket surrounding the communications element having the at least one elongated strength member embedded therein.

12. The method of claim 11, wherein the polyolefin material is selected from the group consisting of medium density polyethylene and high density polyethylene, wherein the material forming the elongated strength member is selected from the group consisting of fiberglass reinforced epoxy and steel and wherein the copolymer adhesion promoting material is selected from the group consisting of a graft copolymer of maleic anhydride and polyethylene and a graft copolymer of ethylene acrylic acid and polyethylene.

13. The method of claim 11, wherein the communications element is an optical fiber.

14. A method for making a telecommunications cable, the method comprising:

provided a communications element;

providing an armor layer around the communications element;

extruding a blend of a polyolefin material and a copolymer adhesion promoting material to form a jacket contacting the armor layer.

15. The method of claim 14, wherein the polyolefin material is selected from the group consisting of medium density polyethylene and high density polyethylene, wherein the material forming the armor layer is selected from the group consisting of aramid yarns and wherein the copolymer adhesion promoting material is selected from the group consisting of a graft copolymer of maleic anhydride and polyethylene and a graft copolymer of ethylene acrylic acid and polyethylene.

16. The method of claim 14, wherein the communications element is an optical fiber.

17. The telecommunications cable of claim 1, wherein the copolymer adhesion promoting material is selected from the group consisting of a graft copolymer of maleic anhydride and polyethylene and a graft copolymer of ethylene acrylic acid and polyethylene.

18. The telecommunications cable 10 of claim 5, wherein the copolymer adhesion promoting material is selected from the group consisting of a graft copolymer of maleic anhydride and polyethylene and a graft copolymer of ethylene acrylic acid and polyethylene.

19. The method of claim 11, wherein the copolymer adhesion promoting material is selected from the group consisting of a graft copolymer of maleic anhydride and polyethylene and a graft copolymer of ethylene acrylic acid and polyethylene.

20. The method of claim 14, wherein the copolymer adhesion promoting material is selected from the group consisting of a graft copolymer of maleic anhydride and polyethylene and a graft copolymer of ethylene acrylic acid and polyethylene.

* * * * *

UNITED STATES PATENT AND TRADEMARK OFFICE
CERTIFICATE OF CORRECTION

PATENT NO. : 6,198,865 B1
DATED : March 6, 2001
INVENTOR(S) : Brian G. Risch

It is certified that error appears in the above-identified patent and that said Letters Patent is hereby corrected as shown below:

<u>Column 8, claim 17, line 6,</u>
Line 1, after "cable" -- 10 -- should be inserted.

Signed and Sealed this

Twenty-fifth Day of September, 2001

Attest:

Attesting Officer

NICHOLAS P. GODICI
*Acting Director of the United States Patent and Trademark Office*